United States Patent [19]

Florian

[11] 4,049,759
[45] Sept. 20, 1977

[54] METHOD AND ARRANGEMENT FOR USE IN LINING ARTICLES, PARTICULARLY MELTING OVENS

[75] Inventor: Rudolf Florian, Blomberg, Germany

[73] Assignee: Dörentruper Sand- und Thonwerke GmbH, Dorentrup, Germany

[21] Appl. No.: 559,865

[22] Filed: Mar. 19, 1975

[30] Foreign Application Priority Data

Mar. 23, 1974 Germany .............................. 2414060

[51] Int. Cl.² .............................................. F27D 1/16
[52] U.S. Cl. ..................................... 264/30; 249/114; 249/115; 266/281; 264/336; 428/35
[58] Field of Search ................. 264/30, 336; 266/281; 249/114, 115; 428/35

[56] References Cited

U.S. PATENT DOCUMENTS

| | | | |
|---|---|---|---|
| 3,492,383 | 1/1970 | Heimgartner | 264/30 |
| 3,716,316 | 2/1973 | Dekker | 264/30 X |
| 3,916,047 | 10/1975 | Niesen | 264/30 X |

FOREIGN PATENT DOCUMENTS 820,733 9/1959 United Kingdom ................ 266/281

*Primary Examiner*—Thomas P. Pavelko
*Attorney, Agent, or Firm*—Michael J. Striker

[57] ABSTRACT

A method and arrangement for lining articles are disclosed which are particularly well-suited for use in lining melting ovens. The arrangement includes a mold member which is composed of several relatively movable sections so as to permit the dimensions thereof to be changed. For the lining of an oven chamber, the mold member has an external surface the configuration of which corresponds to the inner wall of the oven chamber. This surface is coated with a refractory-containing composition, which is releasably secured over the surface. In coating the mold member the composition is made up in a flowable or plastic state, applied over the external surface of the mold member in this state, and then hardened, for instance, by heating. The composition is of such a nature that the temperatures required for hardening the same are sufficiently low to avoid undesirable effects on the mold member. In order to line the oven chamber, the mold member and its coating of the hardened composition are arranged inside the chamber so that the coating faces the inner wall of the chamber and is spaced therefrom. A ramming mass is then admitted into the space defined between the inner wall of the chamber and the coating. Thereafter, the mold member is disengaged from the coating by causing the sections thereof to move inwardly, thereby decreasing the dimensions of the mold member, and the mold member is then removed from the oven chamber. The hardened coating remains behind and serves to maintain the ramming mass in position. The ramming mass is sintered and is thus converted into a lining for the oven chamber. The method and arrangement make it possible to re-use the relatively expensive mold member since the latter need not be subjected to high temperatures which may be detrimental thereto. Thus, the cheaper refractory-containing composition is sacrificed in order to save the mold member.

12 Claims, 4 Drawing Figures

METHOD AND ARRANGEMENT FOR USE IN LINING ARTICLES, PARTICULARLY MELTING OVENS

BACKGROUND OF THE INVENTION

The invention relates generally to the lining of articles. Of particular interest to the invention are a method and arrangement for the lining of ovens such as melting ovens.

A procedure for finishing a melting oven is known wherein the melting oven is provided with a refractory lining using a ramming mass which is sintered in order to convert the same into a unitary mass constituting the lining. Here, a metal form or mold member is utilized to confine the initially particulate ramming mass. The mold member, which is of smaller dimensions than the oven chamber which is to be lined, is inserted into the oven chamber so that a space is defined between the mold member and the inner wall of the chamber. The ramming mass is poured into this space and thereafter sintered.

Three methods have been used heretofore for finishing a melting oven in accordance with a procedure of the type just outlined.

A first method for finishing a melting oven according to a procedure of the type outlined above consists in placing the metal mold member is an oven which has been completed to the point where it is ready to be provided with a lining. The ramming mass is poured in and, with the mold member still in position in the oven, is sintered. As a result of the sintering operation, the particles of the ramming mass cohere and the ramming mass becomes firm. As already mentioned, the metal mold member remains in the oven during the sintering operation. By virtue of this, the mold member is melted. In other words, in order to finish an oven of this type in the manner described, a new metal mold member is required for each finishing or lining operation. Since the costs for a metal mold member of the type utilized are very high, the disadvantage of the method just described is readily apparent.

Another known method for the finishing of a melting oven resides in that a ramming mass of a very precisely determined composition is utilized. After placing the metal mold member in the oven and pouring in the ramming mass as before, the metal mold member is withdrawn from the oven and a binding agent is sprayed onto the inner layer of the ramming mass. In this manner, the ramming mass is hardened to a certain depth. Subsequently, the remainder of the ramming mass is solidified by heating.

In the latter method, the special composition of the ramming mass is intended to permit the withdrawal of the metal mold member from the ramming mass, after this has been poured in, without damage to the ramming mass, which later has as yet undergone no substantial hardening. Although it is true that this method enables the metal mold member to be used as often as desired, it has, however been observed that this method is not entirely satisfactory. Thus, it has been found that, despite the use of a ramming mass having a special composition, the desired result is dependent upon so many factors which cannot be controlled with any degree of certainty, that an economically feasible utilization of this method is not possible.

Still another method has been used in which, again, a metal mold member is placed in the oven and a ramming mass is poured in. Here, after pouring in of the ramming mass, the metal mold member is heated to such an extent that the layer of the ramming mass immediately adjacent the outer wall of the metal mold member is rigidified to a certain extent. Thereafter, the metal mold member is cooled with compressed air and then withdrawn from the oven. Subsequently, sintering of the ramming mass is completed.

In accordance with the last-described method, the metal mold member is also not melted and can thus be reused. However, a disadvantage of this method resides in that the metal mold member is very strongly corroded by virtue of the heating and subsequent cooling thereof so that re-use of the metal mold member is possible only under very limited conditions.

It will be appreciated, therefore, that improvements in the state of the art are desirable.

SUMMARY OF THE INVENTION

It is, accordingly, a general object of the invention to provide a novel method and a novel arrangement for use in the lining of articles.

Another object of the invention is to provide a method and arrangement for use in the lining of articles by means of a particulate mass which enable a member utilized for confining the mass to be re-used as often as desired.

An additional object of the invention is to provide a method and arrangement for use in the lining of articles by means of a particulate mass which enable articles to be lined in a simple, economical and non-problematical manner.

A further object of the invention is to provide a method and arrangement for use in the lining of articles by means of a particulate mass which enable a member utilized for confining the mass to be re-used without the imposition of limitations on the conditions under which the member may be re-used.

It is also an object of the invention to provide a method and arrangement for use in the lining of articles by means of a particulate mass which enable flaws and defects in the lining to be avoided with a high degree of certainty.

A concomitant object of the invention is to provide a method and arrangemment for the finishing of a melting oven of the character outlined above by means of which lining of the melting oven becomes possible without incurring the loss of the metal form or mold member and, further, which enable the lining of the melting oven to be performed in such a simple and non-problematical manner, that flaws or defective areas in the completed lining may be reliably avoided.

The foregoing objects, and others which will become apparent hereinafter, are achieved in accordance with the invention. One aspect of the invention relates to a method of lining articles, particularly melting ovens, wherein a member, which is provided with a surface having a configuration corresponding to a face of an article which is to be lined, is coated with a hardenable composition in flowable state. The member will herein be primarily referred to as a form or mold member. The composition coated on the mold member is hardened, and the coated mold member and the article to be lined are arranged relative to one another so that the hardened composition is directed towards the face of the article which is to be provided with the lining and is spaced therefrom. A lining substance is admitted into the space defined intermediate the hardened composition and the face of the article and is rammed and the mold member is freed and removed from the hardened composition.

Subsequent to removal of the mold member from the hardened composition, the lining substance may be rigidified or converted into a unitary, coherent mass. The lining substance may be admitted into the space between the hardened composition and the face of the article in the form of a particulate mass and, in such an event, the lining substance may be poured or shaken into this space. The particulate lining substance may then be converted into a coherent mass by sintering or vitrification, for example. The lining substance may particularly suitably comprise a refractory ramming mass or material.

In accordance with the invention, it is particularly advantageous for the composition with which the mold member is coated to comprise a refractory-containing composition. Here, the composition may be made up to a plastic consistency and then coated on the mold member while in this plastic state. Experiments have shown that a method according to the invention is of particularly favorable applicability when a composition is used which includes about 50 percent by weight of substantially pure quartz sand having an $SiO_2$ content at least 99 percent, approximately 35 percent by weight of finely ground quartz or quartz powder, approximatley 10 percent by weight of dried and ground refractory bond or ball clay, between about 0.5 and 10 percent by weight of a sodium polyphosphate as a binding agent, and approximately 0.2 percent by weight of a carboxymethyl cellulose.

The hardening of the coating composition may involve heating thereof. According to the invention, the temperatures used when hardening the coating composition are advantageously sufficiently low so that the mold member is essentially unaffected by the temperature.

It has also been found favorable to apply a parting agent to the surface of the mold member which is to be coated with the composition prior to application of the latter to this surface. In this manner, the withdrawal of the mold member from the hardened composition subsequent to introduction of the lining substance into the space between the hardened composition and the face of the article to be lined may be simplified.

It is further advantageous to wrap the mold member with a protective web, that is, to apply a protective web about the surface of the mold member which is to be coated with the composition, prior to application of the coating composition to the mold member. In the event that a parting agent is also applied to the mold member, the protective web is wrapped about the mold member subsequent to application of the parting agent to the latter but prior to application of the coating composition thereto. The protective web enables damage to the hardened composition to be avoided during the introduction of the lining substance into the space between the hardened composition and the face of the article to be lined.

In the case of the lining of a chamber, the face to be provided with a lining may be an interior face of the chamber. In such an event, the coating composition is provided on an external surface of the mold member. The arrangement of the mold member and the chamber relative to one another so that the hardened composition is directed towards the interior face of the chamber may here simply involve insertion of the coated mold member into the chamber.

The mold member may be metallic. In accordance with the invention, the mold member may be a multisection form or member.

Particularly insofar as the withdrawal of the mold member from the hardened composition is concerned, it is especially advantageous when a method according to the invention is carried out with a mold member which is made up of a plurality of segments. Thus, where, for instance, the interior of a melting oven chamber is to be provided with a lining so that the coating composition is applied to an external surface of the mold member, the individual segments of the mold member may, after introduction of the lining substance into the chamber, be displaced or swung towards the center of the chamber and, without the danger of damage to the inner surface of the lining of the melting oven, be removed from the latter.

An aspect of the invention relates to an arrangement for use in lining articles, particularly melting ovens, which comprises a member of the general character outlined above. Thus, one embodiment of an arrangement in accordance with the invention for use in lining articles includes a member, that is, a form or mold member, of predetermined dimensions provided with a surface having a configuration corresponding to a face of an article which is to be lined. The mold member comprises a plurality of relatively movable sections so as to permit a change in at least one of the dimensions of the mold member. A refractory-containing composition is releasably coated on the just-mentioned surface of the mold member. Accordingly, when the composition is arranged opposite a face of an article which is to be lined in a manner such that a space for the confinement of a lining substance is defined intermediate the composition and this face of the article, a change in one or more dimensions of the mold member permits disengagement and removal of the mold member from the composition. This, in turn, permits conversion or transformation of the lining substance into a lining for the article, that is, into a firm, coherent mass, in the absence of the mold member. In this manner, damage to the mold member may be avoided and the mold member may subsequently be re-used.

An arrangement according to the invention is particularly well-suited for carrying out a method in accordance with the invention.

A favorable embodiment of the invention contemplates for the refractory-containing coating on the mold member to comprise a mass having the composition indicated previously. The mold member in an arrangement according to the invention may be metallic.

An advantageous embodiment of the invention provides for the mold member to comprise a plurality of circumferential segments defining a passage. A connecting member is arranged in the passage and connecting means is provided to connect the segments with the connecting member. The connecting means may, for example, be in the form of screws. An embodiment of the invention contemplates the provision of three circumferential segments, with the connecting member being of substantially star-shaped configuration after mounting, and having three separate arms each of which is connected with the segments.

An arrangement according to the invention may have a protective web arranged intermediate the mold member and the refractory-containing composition which coats the latter. It is also possible to provide a parting agent on that surface of the mold member which is coated with the refractory-containing composition. In the event that a protective web is provided, the parting agent is arranged intermediate the mold member and the protective web. On the other hand, in the absence of a protective web, the parting agent is simply arranged intermediate the mold member and the refractory-containing coating.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

As indicated previously, of particular interest to the invention is a method for the finishing or lining of a melting oven which is provided with its refractory lining by pouring or shaking a ramming material or mass therein using a metal form or mold member, as well as an arrangement for carrying out the method. The description which follows will, therefore, be primarily in these terms.

With this in mind, according to one aspect of the method of the invention, the metal mold member is coated with a plastic, refractory mass and the mass is hardened at temperatures which do not cause the metal mold member to be corroded or attacked. The metal mold member provided with the hardened mass is brought into an oven which has been finished to the point at which it is to be lined. Then, the ramming material is poured or shaken into the oven and the mold member is disengaged from the hardened mass and taken out of the oven.

One of the important advantages achievable with the invention resides in that the hardened refractory mass possesses such a high strength, that the operation for converting the ramming material into a firm and coherent body, e.g, the sintering operation, may be effected without requiring the metal mold member to remain in the oven. Thus, a very significant savings may be realized since coating of the metal mold member with the hardenable mass involves substantially lower costs than those associated with the metal mold member itself.

Figure 1:
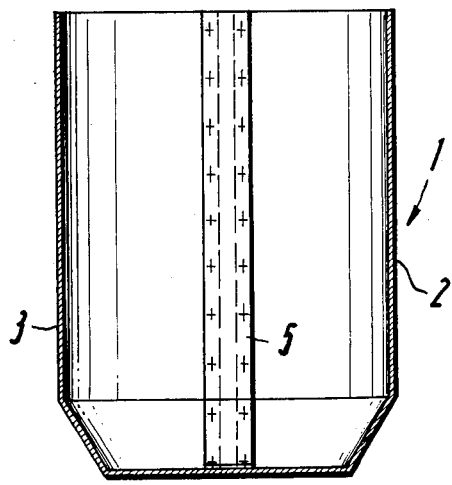
FIG. 1 represents a section through one form of a mold member according to the invention which may be used for carrying out a method in accordance with the invention.
Figure 2:
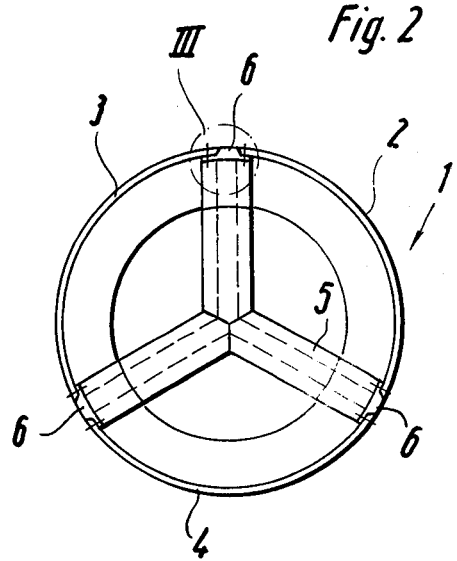
FIG. 2 is a plan view of the mold member of FIG. 1.

Referring now to the drawing, and, in particular, to FIGS. 1 and 2 thereof, it is pointed out that these illustrate a multisection metal mold member in accordance with the invention. The mold member is indicated generally by the reference numeral 1. As most clearly seen in FIG. 2, the particular mold member 1 shown includes three segments identified by the reference numerals 2, 3 and 4, respectively.

The mold member 1 further includes an intermediate or connecting section 5 comprising three separate arms which serves to unite the segments 2, 3 and 4 into a relatively rigid body. In the present instance, the construction is such that the connecting section 5 unites the segments 2, 3 and 4 into the form of a cylinder, that is, the mold member 1 is of cylindrical configuration. As is particularly clear from FIG. 2, the connecting section 5 is here of a star-shaped configuration after mounting of the three separate arms.

Figure 3:
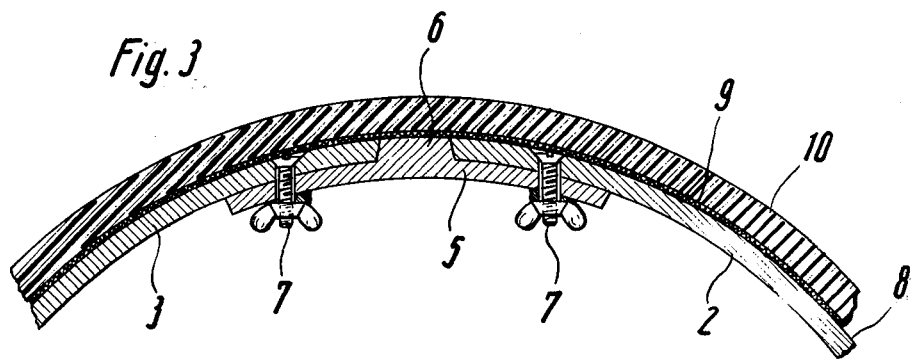
FIG. 3 is an enlarged view of the area indicated at III in FIG. 2 after coating of the mold member.

With reference now to FIG. 3 also, it may be seen that each of the arms of the connecting section 5 is provided with a projection or bulge 6 at the outer end thereof, that is, at the end thereof adjacent the respective segements 2, 3 and 4. In the illustrated embodiment, the projections 6 are of approximately conical configuration. As best illustrated in FIG. 3, the longitudinally extending edges of the segments 2, 3 and 4 abut against the respectively adjacent projections 6.

Suitable connecting means is provided for connecting the segments 2, 3 and 4 with the connecting section 5. The connecting means is here shown as being in the form of screws 7. When the connecting section 5 and the segments 2, 3 and 4 are connected with one another by means of the screws 7, the segments 2, 3 and 4 and the connecting section 5 together form a cylinder having a substantially smooth outer wall.

FIG. 3 further illustrates how the metal mold member 1 may be coated for the purpose of carrying out a method in accordance with the invention. Thus, it will be seen that a refractory mass 10 is provided over the outer surface of the mold member 1.

In the present instance, a parting agent is applied to the outer surface of the mold member 1 and this is indicated by the reference numeral 8. It will be clear that the parting agent 8 is applied to the outer surface of the mold member 1 prior to application of the refractory mass 10 thereover. A function of the parting agent 8 is to simplify the later disengagement of the segments 2, 3 and 4, as well as of the connecting section 5, from the subsequently completed coating. Any industrial grease or lubricant may be used for the parting agent 8. Representative of the parting agents which may be used is cup grease.

A protective web is also provided in the present instance. The protective web is here indicated by the reference numeral 9 and it may be seen that the mold member 1 is wrapped exteriorly thereof with the protective web 9. As is apparent, the protective web 9 is applied over the outer surface of the mold member 1 subsequent to application of the parting agent 8 but prior to application of the refractory mass 10. The protective web 9 may, for example, be composed of cotton. In practice, the protective web 9 need normally not consist of anything more than a muslin bandage which has been stiffened.

One purpose of the protective web 9 is to prevent tearing, cracking or breakage, during introduction of the ramming material, of the hard shell constituted by the refractory mass 10, which latter is in a hardened state at this time as will be discussed more fully below. The protective web 9 may achieve this result since it is installed inside this hard shell and may thus prevent the latter from impacting the mold member 1. The protective web 9 may also serve a second purpose. This resides in simplifying the application of the initial quantities of the refractory mass 10 onto the mold member 1. Thus, the refractory mass 10 is in a plastic state when it is applied over the mold member 1. Since the refractory mass 10 is in a soft state during the application thereof over the mold member 1, great difficulty may be encountered in obtaining a grip of the refractory mass 10 on the parting agent 8 if the refractory mass 10 is directly applied over the latter. The protective web 9 greatly simplifies the obtention of a grip under such circumstances. After the introduction of the ramming material, the function of the protective web 9 is completed and this may burn up during the heating which may subsequently be carried out in order to rigidify the ramming material.

Referring again to FIG. 3, it may be seen that the refractory mass 10 is applied over the protective web 9. As already indicated, the refractory mass 10 is in a plastic or flowable state when it is applied over the protective web 9. The refractory mass 10 comprises a hardenable composition so that it may be converted into a hardened state subsequent to being applied over the protective web 9. Advantageously, the plastic refractory mass 10 is selected in such a manner that it may be dried, and concomitantly, hardened, at temperatures between about 60° and 80° centigrade. The time required for drying or hardening the plastic refractory mass 10 may, for instance, be of the order of 4 hours or so.

In accordance with the invention, the refractory mass 10 may favorably be composed of a mixture which contains about 50 percent by weight of substantially pure quartz sand having a $SiO_2$ content of at least 99 percent, about 35 percent by weight of finely ground quartz or quartz powder, about 10 percent by weight of refractory bond or ball clay which has been dried and ground and, depending upon the proportions of these substances which are actually used, between about 0.5 and 10 percent by weight of a sodium polyphosphate as a chemical binding agent, as well as about 0.2 percent by weight of a carboxymethyl cellulose, e.g., sodium carboxymethyl cellulose.

The sodium polyphosphate used may be a highly condensed sodium polyphosphate the chains of which are of short to intermediate length. Exemplary of the sodium polyphosphates which may be used is one having a $P_2O_5$ content of about 65 percent.

The carboxymethyl cellulose used is favorably a cellulose ether which has, at least to a large extent, been freed of sodium chloride and sodium glycolate. Representative of the carboxymethyl celluloses whicy may be used is one having a degree of etherization (degree of substitution) of about 0.8 and an average viscosity of about 8000 centipoises as measured in a rotational viscometer using a 2 percent solution the concentration of which is as determined on an airdried basis. The moisture content of the carboxymethyl cellulose is favorably below about 10 percent. The carboxymethyl cellulose granulate preferably has a particle size between about 0.2 and 1 millimeter.

The following illustrates one manner of making up the plastic refractory mass 10 and applying the same over the mold member 1:

The different components of the refractory mass 10 are mixed with one another in the desired proportions, the mixing being carried out while the components are in the dry state. After mixing, so much water is stirred into the mixture that a plastic mass of thin consistency is obtained. This plastic mass may now be applied over the mold member 1. The application of the thin plastic mass to the mold member 1 is best carried out with a brush, for instance, a hand sweeper or hand brush. Generally, three or four applications of the thin plastic mass to the mold member 1 will result in a coating thickness of about 4 to 6 millimeters, this thickness being adequate for the purposes of the invention. A short drying operation is performed between applications. When the application of the thin plastic mass to the mold member 1 has been completed, the entire plastic mass coating layer is dried throughout in order that this mass may achieve its highest hardness. It has been found that the entire coating operation may, with advantage, be carried out using a movable carriage on which the mold member 1 is mounted in such a manner that it may be rotated about its axis, either by hand or by means of a motor.

Figure 4:
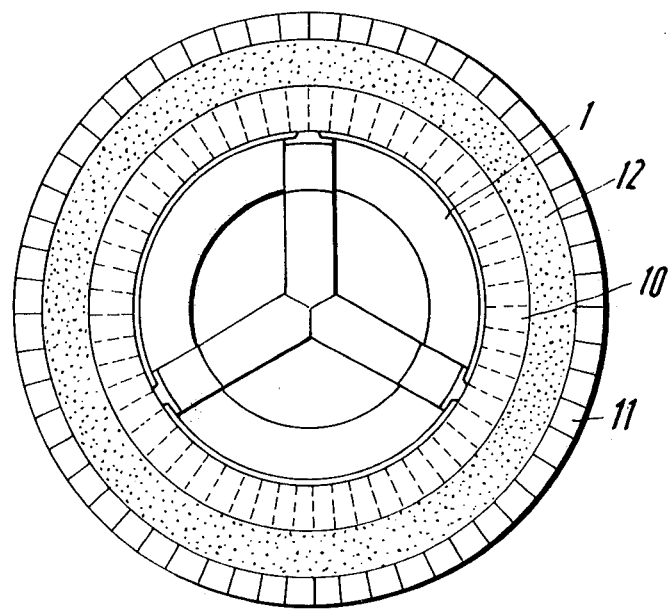
FIG. 4 is a plan view, partially in section, schematically illustrating the coated mold member as being used in the preparation of the interior of an oven chamber for lining.

Referring now to FIG. 4, it is pointed out that this illustrates the lining of a melting oven 11 using a ramming material. It will be seen that the melting oven 11 has been shown as having a cylindrical configuration. It will be appreciated that the melting oven 11 has been finished to a point where it is ready to be provided with a refractory lining interiorly thereof.

In order to line the interior of the melting oven 11, the mold member 1 is assembled and it will be clear that the mold member 1 is here chosen so as to have a cylindrical configuration in order that the external surface thereof may correspond to the inner face of the melting oven 11. After assembly of the mold member 1, the plastic refractory mass and, if desired or necessary, the parting agent 8 and/or the protective web 9, are applied over the external surface of the mold member 1. The plastic refractory mass is then permitted to harden. Hardening of the plastic refractory mass may be effected by heating the coated mold member 1 and, as mentioned previously, the refractory mass 10 is advantageously selected in such a manner that the drying and concomitant hardening thereof may be effected within a reasonable period of time at temperatures between about 60° and 80° C.

By selection of the refractory mass 10 so that hardening thereof may occur between about 60° and 80° C, there is obtained the advantage that the metal mold member 1 is not corroded or otherwise attacked due to the temperatures required for hardening the refractory mass 10. Accordingly, it becomes possible to reuse the metal mold member 1 as often as desired and this will become even more apparent shortly.

Subsequent to hardening of the refractory mass 10, the coated mold member 1 is placed inside the melting oven 11. It will be understood that the dimensions of the mold member 1 and, in particular, the outer diameter thereof, are chosen to be so much smaller than the inner diameter of the melting oven 11, that a space 12 is defined between the inner face of the melting oven 11 and the outer surface of the refractory mass 10 provided on the mold member 1.

After the coated mold member 1 has been positioned in the melting oven 11, a ramming material is poured into the space 12 and rammed therein by vibration. The ramming material here comprises a refractory and may, for example, be a $SiO_2$-containing refractory having a $SiO_2$ content of up to, and even exceeding, 99 percent. The following composition is provided as exemplary of the compositions which may be used for the ramming material:

40 percent by weight of quartzite having a particle size between about 1 and 4 millimeters 20 percent by weight of quartzite having a particle size between about 0.25 and 1 millimeter.

18 percent by weight of quartzite having a particle size between about 0.063 and 0.25 millimeter.

22 percent by weight of quartzite having a particle size of less than about 0.063 millimeter.

The ramming material may further include a boric acid addition, e.g., finely ground technical boric acid. The boric acid is preferably used in amounts between about 0.5 and 2.0 percent by weight, the quantity actually used being dependent upon the temperatures to which the lining formed from the ramming material is subjected during use.

Subsequent to ramming of the ramming material in the space 12, the mold member 1 is disengaged or loosened from the refractory mass 10, and also the protective web 9 if this is provided. The disengagement of the mold member 1 from the refractory mass 10 is effected by first removing the nuts on the screws 7 associated with the arms of the connecting section 5 and then simply taking off the corresponding arm or arms of the connecting section 5.

It may be seen that retraction of one or more of the arms of the connecting section 5 enables the contact between the connecting section 5 and the segments 2, 3 and 4 to be relieved thereby freeing the latter for movement. The segments 2, 3 and 4 may then be displaced inwardly towards the center of the mold member 1. As a consequence, the mold member 1, that is, the segments 2, 3 and 4 and the connecting section 5, may be readily withdrawn from the melting oven 11.

Upon the withdrawal of the mold member 1 from the melting oven 11, the hardened refractory mass 10 remains behind to keep the rammming material confined in the space 12. It will be appreciated that the refractory mass 10 and the thickness thereof are so chosen that the shell constituted by the refractory mass 10 possesses sufficient strength to maintain the ramming material confined in the space 12. In effect, the refractory mass 10 serves as a substitute mold member.

After withdrawal of the mold member 1 from the melting oven 11, the ramming material is converted into a coherent body constituting a lining for the interior of the melting oven 11. In the present instance, this is accomplished by heating to temperatures which are sufficiently high so as to cause sintering or vitrification of the ramming material to occur. Since the mold member 1 is removed from the melting oven 11 prior to this heating operation, it will be clear that the danger of damage to the mold member 1 by virtue of the high temperatures used during sintering or vitrification is avoided.

It will be understood that the mass 10 is favorably refractory in order to be able to withstand the high temperatures utilized for sintering or vitrification of the ramming material and to be capable of maintaining the latter confined in the space 12 during such operation. However, the refractory mass 10 is normally less highly refractory than the ramming material.

One reason for this is that, in order to enable the refractory mass 10 to be relatively evenly coated over the mold member 1, the plastic refractory mass used for the coating of the mold member 1 should have a different composition than the dry ramming material. Thus, as mentioned previously, the ramming material may, for example, be a $SiO_2$-containing refractory having a $SiO_2$ content of more than 99 percent. On the other hand, a $SiO_2$-containing plastic mass for coating the mold member 1 would have a lower $SiO_2$ content and, accordingly, would be considerably less highly refractory and less durable than the dry ramming material. However, the plastic refractory mass may, without any cause for concern, be less durable and less highly refractory than the ramming material. Thus, as will now be apparent, the refractory mass 10 formed from the plastic refractory mass serves primarily as an auxiliary means which is intended to hold or support the dry ramming material for only such a period of time as may be required for the latter to become properly rigidified through heating. Thereafter, the refractory mass 10 has served its function. The refractory mass 10 wears away relatively rapidly during the operation of the melting oven 11 and is usually already worn away after the second or third melting operation carried out therein.

To outline some of the advantages achievable with the invention, it may be pointed out that, by selecting the refractory mass 10 so that the hardening temperature therefor is between about 60° and 80° C, it is possible to substantially avoid corrosion or attack of the metal mold member 1. Hence, the mold member 1 may be used time and again. Furthermore, by providing for the metal mold member 1 to be constructed of a plurality of sections, the withdrawal of the mold member 1 from the melting oven 11 to be finished or lined may be greatly simplified and, in addition, the danger of damage to the mold member 1 may be substantially reduced. Also, since the coating of the mold member 1 with the refractory mass 10 may be carried out outside of the melting oven 11 to be finished or lined, the lining of such an oven may, as a result, be undertaken out of storage so to speak. In other words, it is possible to provide several mold members, to coat these with a plastic refractory mass and to then place the coated mold members in storage for use as the need arises.

It will be understood that each of the elements described above, or two or more together, may also find a useful application in other types of lining applications differing from the type described above.

While the invention has been illustrated and described as embodied in a method and arrangement for use in lining melting ovens, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of lining an article, particularly a melting oven, comprising the steps of assembling a plurality of sections with one another so as to form a mold member with a surface having a configuration corresponding to a face of the article which is to be lined; applying to said surface a parting agent; coating said surface above said parting agent with a hardenable composition in flowable state, said composition being hardenable under conditions such that the configuration of said member retains substantially unchanged, and said composition being hardenable to a hardened state which is maintainable during the rigidification of a lining surface for said article; hardening said composition to said hardened state under said conditions; arranging the coated member and said article relative to one another so that the hardened composition is directed towards said face and is spaced therefrom; admitting said lining substance into the space defined intermediate said face and said hardened composition; disassembling said sections from one another; removing said sections from said hardened composition intact and in such a manner that said hardened composition remains as the sole support for said lining substance at the interior of the latter; and subsequently rigidifying said lining substance located in said space intermediate said face and said hardened composition while said hardened composition supports said lining substance at the interior of the same.

2. A method as defined in claim 1, said lining substance comprising a particulate mass; and wherein said admitting comprises pouring said lining substance into said space.

3. A method as defined in claim 1, wherein said lining substance comprises a refractory ramming mass.

4. A method as defined in claim 1, wherein said composition comprises a refractory-containing composition and said coating comprises applying said composition to said member while said composition is in a plastic state.

5. A method as defined in claim 1, said member comprising metal, and said hardening comprising heating said composition; and wherein said hardening is carried out at a temperature which is sufficiently low so that said member is substantially unaffected thereby.

6. A method as defined in claim 1, said article being a chamber, and said face comprising an interior face of said chamber; and wherein said surface is an external surface of said member and said arranging comprises inserting said coated member into said chamber.

7. A method as defined in claim 1, wherein said composition comprises approximately 50 percent by weight of substantially pure quartz sand having an $SiO_2$ content of at least 99 percent, approximately 35 percent by weight of quartz powder, approximately 10 percent by weight of dried and ground refractory ball clay, between about 0.5 and 10 percent by weight of a sodium polyphosphate as a chemical binding agent and approximately 0.2 percent by weight of a carboxymethyl cellulose.

8. A method as defined in claim 1, wherein a protective web is applied to said member subsequent to application of said parting agent and prior to said coating.

9. A method as defined in claim 1, wherein a protective web is applied to said member prior to said coating.

10. A method as defined in claim 1, wherein said lining substance comprises a refractory particulate mass which is rigidified by sintering and said composition comprises refractory material imparting to said hardened composition the ability to support said lining substance during sintering thereof.

11. A method as defined in claim 2, wherein said rigidifying comprises sintering said lining substance.

12. A method as defined in claim 1, wherein said form comprises a plurality of circumferentially adjacent sections.

* * * * *